United States Patent
Suzuki

(10) Patent No.: US 7,836,926 B2
(45) Date of Patent: Nov. 23, 2010

(54) PNEUMATIC TIRE WITH RIB HAVING WIDTHWISE SIPES AND CIRCUMFERENTIAL SIPE

(75) Inventor: Takayuki Suzuki, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 872 days.

(21) Appl. No.: 11/800,385

(22) Filed: May 4, 2007

(65) Prior Publication Data

US 2007/0284026 A1 Dec. 13, 2007

(30) Foreign Application Priority Data

Jun. 7, 2006 (JP) .......................... JP2006-158232

(51) Int. Cl.
 *B60C 11/04* (2006.01)
 *B60C 11/12* (2006.01)
(52) U.S. Cl. ............................. 152/209.18; 152/209.22; 152/209.25; 152/209.27; 152/DIG. 3; 152/901
(58) Field of Classification Search ............ 152/209.18, 152/209.22, 209.25, 209.27, DIG. 3, 901
 See application file for complete search history.

(56) References Cited

U.S. PATENT DOCUMENTS

| | | | | | |
|---|---|---|---|---|---|
| 2,938,560 | A | * | 5/1960 | Wallace et al. | 152/209.27 |
| 4,449,560 | A | * | 5/1984 | Tansei et al. | 152/209.23 |
| 5,772,806 | A | * | 6/1998 | Moriya | 152/DIG. 3 |
| 6,142,200 | A | * | 11/2000 | Feider et al. | 152/DIG. 3 |
| 6,196,288 | B1 | * | 3/2001 | Radulescu et al. | 152/DIG. 3 |
| 2002/0033214 | A1 | * | 3/2002 | Carra et al. | 152/209.9 |

FOREIGN PATENT DOCUMENTS

| | | | |
|---|---|---|---|
| JP | 63-137003 | * | 6/1988 |
| JP | 01-215603 | * | 8/1989 |
| JP | 05-169917 | * | 7/1993 |
| JP | 2000-225815 | * | 8/2000 |
| JP | 2002-067621 | * | 3/2002 |
| JP | 2003-226116 | * | 8/2003 |

OTHER PUBLICATIONS

Machine translation for 2003-226116 (no date).*
Machine translation for Japan 2002-067621 (no date).*
Machine translation for Japan 2000-225815 (no date).*
Machine translation for Japan 05-169917 (no date).*

* cited by examiner

*Primary Examiner*—Steven D Maki
(74) *Attorney, Agent, or Firm*—Greer, Burns & Crain, Ltd.

(57) ABSTRACT

A circumferential sipe extends continuously in the circumferential direction of the tire in the center region of the tread surface section of a rib defined between circumferential grooves. Widthwise sipes are disposed at prescribed intervals in the circumferential direction of the tire in the tread surface section, the widthwise sipes extending in the widthwise direction of the tire in crossing relationship to the circumferential sipe, the widthwise sipes each having opposing terminal ends open to the circumferential grooves. The circumferential sipe changes in depth periodically in such a manner that the circumferential sipe is shallow between adjacent widthwise sipes. The widthwise sipes changes in depth in such a manner that they are greater in depth in the center region and end regions of the tread surface section.

12 Claims, 2 Drawing Sheets

PNEUMATIC TIRE WITH RIB HAVING WIDTHWISE SIPES AND CIRCUMFERENTIAL SIPE

BACKGROUND OF THE INVENTION

The present invention relates to pneumatic tires, and more particularly, to a pneumatic tire which can improve uneven wear resistance and wet performance.

In general, pneumatic tires including a tread surface having a rib pattern, used for heavy duty vehicles such as buses and trucks, receive greater traverse shear strain at the end portions of the ribs than at the center portion thereof when the tires are engaged with a ground. Therefore, the compression amount of the end portions of the ribs in the circumferential direction and widthwise direction of the tire increases, whereby the end portions of the ribs locally go up in ground contact pressure, resulting in that such uneven wear that the end portions of the ribs wear more rapidly is apt to occur. In particular, pneumatic tires having rib patterns, used for the steering-wheel tires of trucks and buses which mainly travel a long distance consecutively at a high speed, strongly have such tendencies.

It has been conventionally known, for example, to provide sipes in the end portions of the ribs facing the circumferential grooves as measures for the above (see Japanese Patent Application Kokai Publication Nos. 2002-36819 and 2005-59620, for example). The sipes lower the ground contact pressure of the end portions of the ribs, whereby the ground contact pressure of the tread surface is more even, allowing uneven wear of the ribs to be reduced. There has also been proposed a technique of providing a rib with a row of sipes comprising tire-circumferentially extending sipes disposed at prescribed intervals in the circumferential direction of the tire (see Japanese Patent Application Kokai Publication No. 2000-16024, for example).

However, demands for tire performance improvements from the market have never stopped, and further improvement in uneven wear for pneumatic tires having rib patterns is required. The pneumatic tires having rib patterns have disadvantages that they are inferior in wet performance to pneumatic tires having block patterns; improvement of the wet performance is also required.

SUMMARY OF THE INVENTION

An object of the present invention is to provide a pneumatic tire including a tread surface having a rib defined between circumferential grooves extending in the circumferential direction of the tire, in which uneven wear resistance of the rib can be improved and wet performance can be enhanced.

In order to achieve the above object, a pneumatic tire according to the present invention includes a tread surface having circumferential grooves extending in a circumferential direction of the tire, a rib being defined between the circumferential grooves, the rib including a tread surface section having a center region, end regions and middle regions between the center region and the end regions, a circumferential sipe extending continuously in the circumferential direction of the tire in the center region of the tread surface section, widthwise sipes being disposed in the tread surface section of the rib at prescribed intervals in the circumferential direction of the tire, the widthwise sipes extending in a widthwise direction of the tire in crossing relationship to the circumferential sipe, the widthwise sipes each having opposing terminal ends open to the circumferential grooves, the widthwise sipes each having a widthwise sipe portion in the center region of the tread surface section, widthwise sipe portions in the end regions of the tread surface section and widthwise sipe portions in the middle regions of the tread surface section, the widthwise sipes each having a depth changing in such a manner that the widthwise sipe portions in the center region and end regions of the tread surface section are greater in depth than the widthwise sipe portions in the middle regions of the tread surface section, the circumferential sipe having a depth changing in such a manner that the circumferential sipe is partially shallow between adjacent widthwise sipes.

According to the present invention described above, the circumferential sipe and the widthwise sipes mentioned above enable shear strain in the widthwise direction of the rib acting on the ends of the rib facing the circumferential grooves when the tire is engaged with a ground to be dispersed to the center side of the rib to thereby moderate the shear strain. Therefore, the compression amount of the ends of the rib in the circumferential direction and widthwise direction of the tire is reduced, and ground contact pressure in the ends of the rib can be suppressed from locally increasing. Thus, uneven wear of the rib can be improved.

On the other hand, the circumferential sipe and widthwise sipes can provide long edge distances in the circumferential direction and widthwise direction of the tire, resulting in that a high grip force can be shown by the edge effect during running on a wet road surface. Accordingly, braking and driving performance can be enhanced during running on a wet road surface, allowing wet performance to be improved.

DESCRIPTION OF THE PREFERRED EMBODIMENTS

An embodiment of the present invention will be described in detail below with reference to the drawings.

Figure 1:
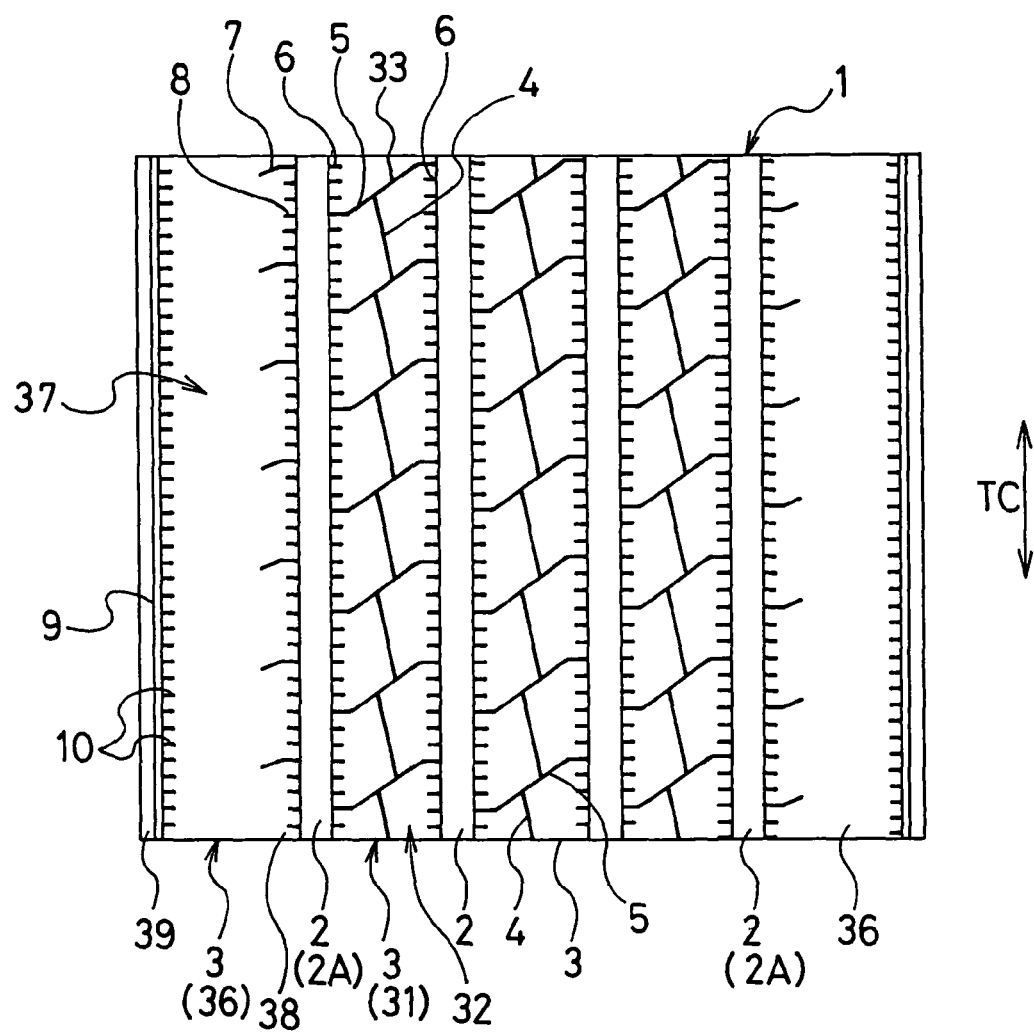
FIG. 1 is a partial development view of a tread surface showing an embodiment of a pneumatic tire according to the present invention.

Referring to FIG. 1, there is shown an embodiment of a pneumatic tire a tire according to the present invention, which is an example of a heavy duty pneumatic tire used for trucks and buses; reference numeral 1 denotes a tread surface. The tread surface 1 has a plurality of (four as an example in FIG. 1) circumferential grooves 2 extending straight in the circumferential direction TC of the tire, and a plurality of ribs 3 are defined by the circumferential grooves 2.

Each rib 31 formed between adjacent circumferential grooves 2 includes a tread surface section 32 having a center region 33 centrally in the widthwise direction of the tire, and there is provided in the center region 33 a circumferential sipe 4 which continuously extends in zigzag in the circumferential direction TC of the tire. Disposed at prescribed intervals in the circumferential direction TC of the tire in the tread surface section 32 of the rib 31 are widthwise sipes 5 which extend in the widthwise direction of the tire in crossing relationship to the circumferential sipe 4, each widthwise sipe 5 having opposing terminal end open to the adjacent circumferential grooves 2.

Figure 2:
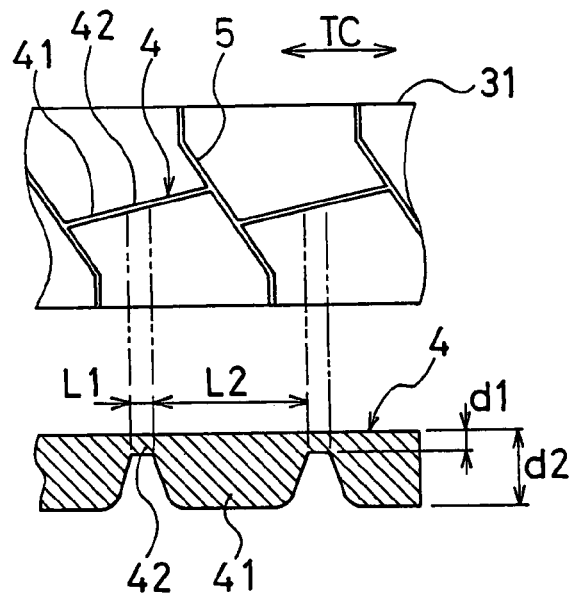
FIG. 2 is an explanatory drawing of a circumferential sipe in FIG. 1 showing a part of the circumferential sipe in a state where it is projected to the widthwise direction of the tire.

The circumferential sipe 4 extends in the circumferential direction TC of the tire changing its depth periodically, as shown in FIG. 2; the depth of the circumferential sipe 4 changes in such a manner that the central portion of a part of the circumferential sipe 4 between adjacent widthwise sipes 5 is partially shallow in depth. In the example shown in FIG. 2, the circumferential sipe 4 has two types of sipe portions 41 and 42 different in depth comprising deep sipe portions 41 which are deep in depth and shallow sipe portions 42 which are shallow in depth, the sipe portions 41 and 42 being alternately disposed; a shallow sipe portion 42 is located centrally between the adjacent widthwise sipes 5.

Figure 3:
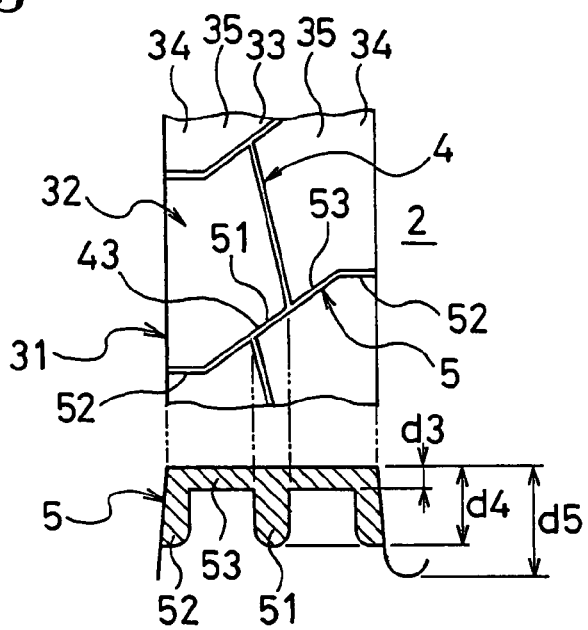
FIG. 3 is an explanatory drawing of a widthwise sipe in, FIG. 1 showing a part of the widthwise sipe in a state where it is projected to the circumferential direction of the tire.

As shown in FIG. 3, each widthwise sipe 5 includes a widthwise sipe portion 51 in the center region 33 of the tread surface section 32, widthwise sipe portions 52 in the end regions 34 thereof on the opposite sides of the tread surface section 32, and widthwise sipe portions 53 in the middle regions 35 thereof between the center region 33 and the end regions 34. The widthwise sipe 5 changes in such a manner that the widthwise sipe portions 51 and 52 in the center region 33 and the end regions 34 are greater in depth than the widthwise sipe portions 53 in the middle regions 35. The widthwise sipe portions 52 in the end regions 34 extend straight along the widthwise direction of the tire. The widthwise sipe portions 51 and 53 extend in a manner inclined toward one side with respect to the widthwise direction of the tire; the widthwise sipe portion 51 overlaps with a zigzag portion 43 of the zigzag circumferential sipe 4 inclined toward the one side.

Figure 4:
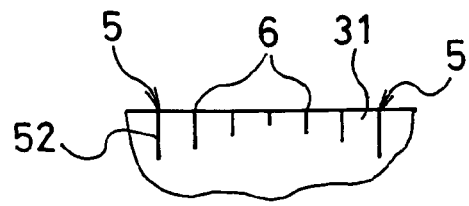
FIG. 4 is a partial enlarged view of a wall surface of a rib showing a relationship in depth between short sipes and widthwise sipes.

Provided at prescribed intervals in the circumferential direction TC of the tire between widthwise sipes 5 adjacent in the circumferential direction TC of the tire in each end region 34 are a plurality of (five as an example in FIG. 1) short sipes 6 which are less in length than the widthwise sipe portions 52 of the widthwise sipes 5 and are open at one terminal ends thereof to a circumferential groove 2 adjacent thereto. As shown in FIG. 4, the short sipes 6 are less in depth than the adjacent widthwise sipe portions 52 in the end region 34, and a short sipe 6 which is more away from the adjacent widthwise sipes 5 is less in depth.

A rib 36 formed on the outer side of each of the outer circumferential grooves 2A of the circumferential grooves 2 has sipes 7 provided at prescribed intervals (the same intervals as the widthwise sipes 5 as an example in FIG. 1) in the circumferential direction TC of the tire, the sipes 7 being open at one terminal ends thereof to the circumferential groove 2A. The rib 36 includes a tread surface section 37 having an inner end region 38 on the circumferential groove 2A side thereof, a plurality of short sipes 8, which are less in length than the sipes 7 and are open at one terminal ends thereof to the circumferential groove 2A, are provided between adjacent sipes 7 in the inner end region 38 at prescribed intervals (the same intervals as the short sipes 6 as an example in FIG. 1) in the circumferential direction TC of the tire. The short sipes 8, like the short sipes 6, are less in depth than the adjacent sipes 7, and a short sipe 8 which is more away from the adjacent sipes 7 is less in depth.

Provided in the outer end region 39 of the tread surface section 37 of the rib 36 is a narrow groove 9 extending straight in the circumferential direction TC of the tire. A plurality of short sipes 10, which are open at one terminal ends thereof to the narrow groove 9, are provided in the tread surface section 37 at prescribed intervals (the same intervals as the short sipes 8 as an example in FIG. 1) in the circumferential direction TC of the tire.

According to the present invention described above, the circumferential sipe 4 that changes in depth in such a manner that it is partially shallow between adjacent widthwise sipes 5 is provided in the center region 33 of the tread surface section 32 of the rib 31, and the widthwise sipes 5 that change such that they are greater in depth in the center region 33 and the end regions 34 are disposed so as to intersect with the circumferential sipe 4 and to traverse the rib 31, whereby shear strain in the widthwise direction of the rib acting on the ends of the rib 31 facing the circumferential grooves 2 when the tire is engaged with a ground can be dispersed to the center side of the rib to thereby moderate the shear strain. Therefore, since the compression amount of the ends of the rib 31 in the circumferential direction and widthwise direction of the tire is reduced, and ground contact pressure in the end regions 34 of the rib 31 can be suppressed from locally increasing, uneven wear of the rib 31 can be improved. If the depths of the circumferential sipe 4 and widthwise sipes 5 do not change but are constant (depths d2 and d4), cracks will be created in the bottoms of the sipes in addition to uneven wear which can not be reduced.

The circumferential sipe 4 and widthwise sipes 5 can provide long edge distances in the circumferential direction and widthwise direction of the tire, resulting in that a high grip force can be shown by the edge effect during running on a wet road surface. Accordingly, braking and driving performance can be enhanced in wet conditions, allowing wet performance to be improved.

Since the circumferential sipe 4 extends in zigzag, shear strain in the widthwise direction of the rib acting on the ends of the rib 31 can be further dispersed while obtaining the longer edge distance of the circumferential sipe 4. The circumferential sipe 4 may be one extending in a wavy fashion in the alternative of the zigzag one; the circumferential sipe 4 may be any one if it extends in the circumferential direction TC of the tire with an amplitude in the widthwise direction of the tire.

By disposing the short sipes 6 in the end regions 34 of the rib 31 as described above, the ground contact pressure locally increasing in the end regions 34 can be further suppressed, allowing uneven wear to be further reduced.

In the present invention, the depth of the circumferential sipe 4 is preferably arranged such that the ratio d1/d2 of the depth d1 of the shallow sipe portions 42 (minimum depth) to the depth d2 of the deep sipe portions 41 (maximum depth) is in the range of 0.1 to 0.5. If the ratio d1/d2 is less than 0.1, the shallow sipe portions 42 are so shallow that it is difficult to effectively improve wet performance. If the ratio d1/d2 is greater than 0.5, cracks are apt to occur at the bottom of the circumferential sipe 4 because movement of the parts of the rib defined by the circumferential sipe 4 is greater.

The ratio L1/L2 of the tire-circumferential length L1 of the shallow sipe portions 42 to the tire-circumferential length L2 of the deep sipe portions 41 is preferably in the range from 0.05 to 0.4. If the ratio L1/L2 is less than 0.05, the areas occupied by the shallow sipe portions 42 are so small that rigidity at the bottom of each shallow sipe portion 42 is lowered, whereby cracks are apt to occur at the bottoms of the shallow sipe portions 42. If the ratio L1/L2 exceeds 0.4, the areas occupied by the shallow sipe portions 42 are so large that the effect of reducing the rubber compression amount is lowered, whereby it is difficult to effectively improve uneven wear of the rib 31.

If the depth of the widthwise sipe portions 53 in the middle regions 35 of the rib 31 is d3, and the depth of the widthwise sipe portions 51 and 52 in the center region 33 and the end regions 34 is d4, the ratio d3/d4 is preferably in the range of 0.05 to 0.5. If the ratio d3/d4 is less than 0.05, the widthwise sipe portions 53 are so shallow that it is difficult to effectively improve wet performance. If the ratio d3/d4 is greater than 0.5, cracks are apt to occur at the bottoms of the widthwise sipes 5 because movement of the parts of the rib defined by the widthwise sipes 5 is greater.

The depth d4 of the widthwise sipe portions 51 and 52 is preferably arranged, with respect to the depth d5 of the circumferential grooves 2, such that the ratio d4/d5 ranges from 0.5 to 1.0. If the ratio d4/d5 is less than 0.5, uneven wear resistance of the rib 31 is deteriorated. If the ratio d4/d5 exceeds 1.0, cracks are created at the bottoms of the widthwise sipe portions 51 and 52, whereby the rib is susceptible to chipping. The depth d5 of the circumferential grooves 2 ranges from 10 mm to 20 mm.

The depth d2 of the deep sipe portions 41 of the circumferential sipe 4 can be in the range of 5 mm to 20 mm. Preferably, with respect to the depth d5 of the circumferential grooves 2, the ratio d2/d5 ranges from 0.5 to 1.0.

As described above, it is preferable that the circumferential sipe 4 extend in the circumferential direction TC of the tire with an amplitude in the widthwise direction of the tire, but there is no limitation thereto; the circumferential sipe 4 may be one that extends straight along the circumferential direction TC of the tire.

It is preferable, in terms of further improvement in uneven wear, that the short sipes 6 be provided; however, a pneumatic tire according to the present invention may be one with no short sipes 6.

The present invention is preferably applicable to heavy duty pneumatic tires having rib patterns, in particular used for the steering-wheel tires of trucks and buses which mainly travel a long distance consecutively at a high speed; however, the present invention is also applicable to heavy duty pneumatic tires having rib-based patterns comprising ribs and blocks mixed therewith; the present invention is not limited to heavy duty pneumatic tires but is also applicable to other types of pneumatic tires.

It should be noted that the sipes referred in the present invention are cuts each having a width of 0.5 mm to 1.0 mm.

EXAMPLE

Prepared respectively were test tires according to the present invention tires 1 to 6, conventional tire, and comparison tires 1 and 2, each having a tire size of 11R22.5; the present invention tires 1 to 6 each have a rib pattern of FIG. 1 in which the ratio d1/d2 of the depth d1 of the shallow sipe portions to the depth d2 of the deep sipe portions, the ratio L1/L2 of the tire-circumferential length L1 of the shallow sipe portions to the tire-circumferential length L2 of the deep sipe portions, and the ratio d3/d4 of the depth d3 of the widthwise sipe portions in the middle regions to the depth d4 of the widthwise sipe portions in the center and end regions are as shown in Table 1; the conventional tire has a tread pattern that is the same as the rib pattern of FIG. 1 except that no widthwise sipes are provided and the circumferential sipes do not extend consecutively but are arranged intermittently (the depth of the circumferential sipes are constant and the same as the depth d2 of the circumferential sipes of the present invention tire 1); the comparison tire 1 has the same arrangement as the conventional tire except that the circumferential sipes extend continuously; the comparison tire 2 has the same arrangement as the present invention tire 1 except that the circumferential sipes and widthwise sipes are constant in depth (the depth of the circumferential sipes is the same as the depth d2 of the circumferential sipes of the present invention tire 1, and the depth of the widthwise sipes is the same as the depth d4 of the widthwise sipes of the present invention tire 1).

In each of the present invention tires 1 to 6, the ratio d4/d5 of the depth d4 of the widthwise sipe portions in the center and end regions to the depth d5 of the circumferential grooves is 0.8, and the depth d2 of the circumferential sipes is 12 mm. The depth of the circumferential grooves of each test tire is 15.0 mm.

The test tires were seated on standard rims, inflated to air pressure of 700 kPa, used for the steering-wheel tires of a truck having a deadweight of 10 ton, and subjected to evaluation testing for uneven wear resistance, wet performance and crack resistance according to the following testing methods, obtaining the results shown in Table 1.

Uneven Wear Resistance

After the test tires were run a distance of 50000 km on roads (80% express ways and 20% public highways), the state of uneven wear of each tire created in ribs between adjacent circumferential grooves was visually inspected and evaluated. The evaluation results are represented by an index where the conventional tire is 100. As the index value is greater, uneven wear resistance is better.

Wet Performance

Full braking was applied to the truck running straight at a speed of 50 km/h on a wet road test course until the truck was stopped, measuring the stop distance. The evaluation results of the measurement distances of the test tires are represented by an index where the conventional tire is 100. As the index value is greater, wet performance is better.

Crack Resistance

In each of the test tires evaluated for the uneven wear resistance, the state of cracking created at the bottoms of the circumferential sipes and the widthwise sipes (if the widthwise sipes are provided) was visually inspected and evaluated. The evaluation results are represented by an index where the conventional tire is 100. As the index value is greater, crack resistance is better. The index value of 95 or more is at a level which is not problematic.

TABLE 1

|  | Conventional Tire | Comparison Tire 1 | Comparison Tire 2 | Present Invention Tire 1 | Present Invention Tire 2 |
|---|---|---|---|---|---|
| d1/d2 | — | — | — | 0.1 | 0.5 |
| L1/L2 | — | — | — | 0.2 | 0.2 |
| d3/d4 | — | — | — | 0.3 | 0.3 |
| Uneven Wear Resistance | 100 | 100 | 80 | 110 | 110 |
| Wet Performance | 100 | 105 | 110 | 105 | 110 |
| Crack Resistance | 100 | 90 | 60 | 100 | 95 |

|  | Present Invention Tire 3 | Present Invention Tire 4 | Present Invention Tire 5 | Present Invention Tire 6 |
|---|---|---|---|---|
| d1/d2 | 0.3 | 0.3 | 0.3 | 0.3 |
| L1/L2 | 0.05 | 0.4 | 0.2 | 0.2 |
| d3/d4 | 0.3 | 0.3 | 0.05 | 0.5 |
| Uneven | 110 | 105 | 110 | 105 |

TABLE 1-continued

| | | | | |
|---|---|---|---|---|
| Wear Resistance | | | | |
| Wet Performance | 110 | 105 | 105 | 110 |
| Crack Resistance | 95 | 100 | 100 | 95 |

As can be seen from Table 1, the present invention tires can improve uneven wear resistance and wet performance without a problem of cracking at the bottoms of the sipes.

What is claimed is:

1. A pneumatic tire having a tread surface having circumferential grooves extending in a circumferential direction of the tire, a rib being defined between the circumferential grooves, the rib including a tread surface section having a center region, end regions and middle regions between the center region and the end regions, a circumferential sipe extending continuously in the circumferential direction of the tire in the center region of the tread surface section, widthwise sipes being disposed in the tread surface section of the rib at prescribed intervals in the circumferential direction of the tire, the widthwise sipes extending in a widthwise direction of the tire in crossing relationship to the circumferential sipe, the widthwise sipes each having opposing terminal ends open to the circumferential grooves, the widthwise sipes each having a widthwise sipe portion in the center region of the tread surface section, widthwise sipe portions in the end regions of the tread surface section and widthwise sipe portions in the middle regions of the tread surface section, the widthwise sipes each having a depth changing in such a manner that the widthwise sipe portions in the center region and end regions of the tread surface section are greater in depth than the widthwise sipe portions in the middle regions of the tread surface section, the circumferential sipe having a depth changing in such a manner that the circumferential sipe is partially shallow between adjacent widthwise sipes, wherein the depth of the circumferential sipe changes periodically in such a manner that a ratio $d1/d2$ of a minimum depth $d1$ thereof to a maximum depth $d2$ thereof is 0.1 to 0.5.

2. A pneumatic tire according to claim 1, wherein the depth of the circumferential sipe changes in such a manner that the circumferential sipe is partially shallow in a center area between the adjacent widthwise sipes.

3. A pneumatic tire according to claim 1, wherein the circumferential sipe includes deep sipe portions which are deep in depth and shallow sipe portions which are shallow in depth, the deep sipe portions and shallow sipe portions being alternately placed, the shallow sipe portions each having a tire-circumferential length $L1$, the deep sipe portions each having a tire-circumferential length $L2$, a ratio $L1/L2$ of the tire-circumferential length $L1$ to the tire-circumferential length $L2$ being 0.05 to 0.4.

4. A pneumatic tire according to claim 1, wherein the circumferential sipe extends in the circumferential direction of the tire with an amplitude in the widthwise direction of the tire.

5. A pneumatic tire according to claim 1, wherein the widthwise sipe portions in the middle regions of the tread surface section each have a depth $d3$ and the widthwise sipe portions in the center region and end regions of the tread surface section each have a depth $d4$, a ratio $d3/d4$ of the depth $d3$ to the depth $d4$ being 0.05 to 0.5.

6. A pneumatic tire according to claim 5, wherein the circumferential grooves each have a depth $d5$, a ratio $d4/d5$ of the depth $d4$ to the depth $d5$ being 0.5 to 1.0.

7. A pneumatic tire according to claim 5, wherein the widthwise sipe portions in the center region and middle regions of the tread surface section extend in a manner inclined with respect to the widthwise direction of the tire, the widthwise sipe portions in the end regions of the tread surface section extending along the widthwise direction of the tire.

8. A pneumatic tire according to claim 7, wherein the circumferential sipe extends in zigzag in the circumferential direction of the tire, the circumferential sipe having zigzag portions inclined toward one side, the widthwise sipe portion in the center region of the tread surface section overlapping with a zigzag portion of the circumferential sipe.

9. A pneumatic tire according to claim 5, wherein the rib has short sipes provided at prescribed intervals in the circumferential direction of the tire between the adjacent widthwise sipes in each of the end regions of the tread surface section, the short sipes being less in length than the widthwise sipe portions in the end region and open at one terminal ends thereof to a circumferential groove adjacent thereto.

10. A pneumatic tire according to claim 9, wherein the short sipes are less in depth than the widthwise sipe portions in the end region.

11. A pneumatic tire according to claim 10, wherein a short sipe which is more away from the widthwise sipe portions of the adjacent widthwise sipes in the end region is less in depth.

12. A pneumatic tire according to claim 1, wherein the pneumatic tire is a heavy duty pneumatic tire.

\* \* \* \* \*